(12) United States Patent
Hohner et al.

(10) Patent No.: US 12,267,425 B2
(45) Date of Patent: Apr. 1, 2025

(54) SYNCHRONIZATION OF SECRET KEYS BETWEEN MULTIPLE SERVER INSTANCES

(71) Applicant: SAP SE, Walldorf (DE)

(72) Inventors: Christoph Hohner, Schwetzingen (DE); Martin Schindewolf, Walldorf (DE); Sascha Zorn, Neulussheim (DE); Meinolf Block, Heidelberg (DE)

(73) Assignee: SAP SE, Walldorf (DE)

( * ) Notice: Subject to any disclaimer, the term of this patent is extended or adjusted under 35 U.S.C. 154(b) by 414 days.

(21) Appl. No.: 17/818,750

(22) Filed: Aug. 10, 2022

(65) Prior Publication Data

US 2023/0412374 A1 Dec. 21, 2023

Related U.S. Application Data

(60) Provisional application No. 63/352,364, filed on Jun. 15, 2022.

(51) Int. Cl.
| | | |
|---|---|---|
| *G06F 15/16* | (2006.01) | |
| *G06F 16/23* | (2019.01) | |
| *G06F 16/27* | (2019.01) | |
| *H04L 9/08* | (2006.01) | |

(52) U.S. Cl.
CPC ........ *H04L 9/0894* (2013.01); *G06F 16/2379* (2019.01); *G06F 16/27* (2019.01)

(58) Field of Classification Search
CPC ..... G06F 16/27; G06F 16/2379; H04L 9/0894
See application file for complete search history.

(56) References Cited

U.S. PATENT DOCUMENTS

| | | | |
|---|---|---|---|
| 7,434,203 B2 | 10/2008 | Stienhans et al. | |
| 8,352,427 B2 | 1/2013 | Mohr et al. | |
| 9,021,303 B1* | 4/2015 | DeSouter | G06F 11/1474 |
| | | | 714/15 |
| 9,124,575 B2 | 9/2015 | Friedmann et al. | |
| 9,258,120 B1* | 2/2016 | Allen | H04L 9/0891 |
| 9,460,177 B1* | 10/2016 | Pawar | G06F 16/1865 |
| 9,569,517 B1* | 2/2017 | Smola | G06F 16/27 |
| 9,959,310 B2 | 5/2018 | Foebel et al. | |
| 10,142,100 B2 | 11/2018 | Block et al. | |
| 10,235,531 B2 | 3/2019 | Block et al. | |
| 10,425,225 B1* | 9/2019 | Grubin | H04L 9/0643 |
| 10,505,729 B2 | 12/2019 | Block et al. | |
| 11,296,870 B2 | 4/2022 | Hohner et al. | |
| 2005/0268232 A1 | 12/2005 | Stienhans et al. | |

(Continued)

*Primary Examiner* — Oleg Survillo
(74) *Attorney, Agent, or Firm* — Fish & Richardson P.C.

(57) ABSTRACT

The present disclosure relates to computer-implemented methods, software, and systems for the replication of secret keys between server nodes. Keys for encryption and decryption are persisted in a log file on a first database hosted on a primary server. The log file comprises data for executed database transactions at the first database and key management operations at a first key store. In response to triggering a synchronization between the primary server and a secondary server, a set of sequential entries of the log file are replayed at the secondary server from the first database. An execution of a transaction is replicated at a secondary database at the secondary server based on data for an entry at the log file and a key management operation associated with a key at the first key store that is persisted in another entry of the log file is replicated.

20 Claims, 6 Drawing Sheets

(56) References Cited

U.S. PATENT DOCUMENTS

| | | | |
|---|---|---|---|
| 2012/0084261 A1* | 4/2012 | Parab | G06F 11/1458 |
| | | | 707/674 |
| 2013/0259234 A1* | 10/2013 | Acar | H04L 9/088 |
| | | | 380/278 |
| 2016/0246688 A1* | 8/2016 | Chainani | G06F 16/275 |
| 2018/0012031 A1 | 1/2018 | Block et al. | |
| 2018/0131517 A1 | 5/2018 | Block et al. | |
| 2019/0190960 A1* | 6/2019 | Amro | H04L 63/30 |
| 2021/0099289 A1 | 4/2021 | Hohner et al. | |
| 2021/0194678 A1 | 6/2021 | Schindewolf et al. | |
| 2022/0329413 A1 | 10/2022 | Schindewolf et al. | |

* cited by examiner

SYNCHRONIZATION OF SECRET KEYS BETWEEN MULTIPLE SERVER INSTANCES

CLAIM OF PRIORITY

This application claims priority under 35 USC § 119(e) to U.S. Patent Provisional Application Ser. No. 63/352,364 filed on Jun. 15, 2022, the entire contents of which are hereby incorporated by reference.

TECHNICAL FIELD

The present disclosure relates to computer-implemented methods, software, and systems for data persistency and synchronization.

BACKGROUND

Software complexity is increasing and causes changes to lifecycle management and maintenance of software applications, databases, and platform systems. Customer's needs are transforming, with increased requests for flexibility in terms of processes and landscapes, and also high availability to access data provided by the underlying infrastructure. When an application or application service is running, database resources can be consumed through execution of operations, such as a read operation, a write operation, and an edit operation, among others. Executing processes may read and write data from the database where one or more file records reside. Persisted data may be encrypted and authorization keys may be locally managed to support secure data access.

SUMMARY

Implementations of the present disclosure are generally directed to a computer-implemented method for synchronizing of database keys between server instances.

A failure in the data synchronization processes may cause disruptions when providing services by the software applications and reduction in their availability and performance.

One example method may include operations such as: persisting, in a log file on a first database hosted on a primary server, keys for encrypting and decrypting data persisted at the first database, wherein the keys are managed at a first key store hosted on the primary server, and wherein the log file includes data for executed database transactions at the first database and key management operations at the first key store; and in response to triggering a synchronization between the primary server and a secondary server, replaying, at the secondary server, a set of sequential entries of the log file from the first database hosted on the primary server to replicate executions of (i) a transaction of the executed database transactions at a secondary database at the secondary server based on data for an entry at the log file and (ii) a key management operation from the key management operations associated with a key from the keys at the first key store that is persisted in another entry of the one or more entries of the log file on the first database hosted on the primary server.

In some instances, based on replaying the set of sequential entries of the log file at the secondary server, data at the second database on the secondary server can be synchronized with the data persisted on the first database.

In some instances, a key management operation can include at least one of: creating a new key as a new version of an old key used for encrypting data of a database transaction of a particular type; activating a new key to be used for encrypting the data; and deleting an existing key in the first key store.

In some instances, replaying the log file can be associated with a point-in-time data recovery for transferring one or more keys and a portion of data according to a time point configured for the replaying.

In some instances, the data at the log file can include data that is for the executed database transactions and includes timestamps of execution of the executed database transactions.

In some instances, a key from the keys at the first key store can be defined as a currently active key version for encrypting data for a predefined transaction type executed at the first database.

In some instances, the log file can store data for the executed database transactions and the key management operations in a sequential order, and wherein the replaying is performed according to the sequential order of entries in the log file to replicate (i) the data from the first database to the second database on the secondary server and (ii) the key from the keys at the first key store on the primary server to a second key store on the secondary server.

In some instances, a set of keys of the keys managed at the key store can be associated with a respective type of database transactions associated with a process executed at the first database, wherein the set of keys include different versions of a key for the respective type of database transactions. In some instances, a single key of the set of keys can be a currently active key to be used for encrypting database transactions requested by users.

In some instances, the method can include that in response to identifying a downtime event for the primary server, redirecting user requests for execution of database transactions to the secondary server. The secondary server can be synchronized with the primary server according to a point-in-time synchronization rule configured for replication of data from the primary server to the secondary server according to replaying the log file persisted on the primary server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The present disclosure describes various tools and techniques for replication of secret keys between server node instances.

In some instances, when data and/or data objects are transferred between applications and/or systems, related secret keys used to encrypt and encrypt the data and/or data objects may also need to be transferred. Importing of data and secret keys can be executed in the context of different application scenarios, for example, in a cross-application analytics scenario. In some instances, data defining entities of a database can be defined in association with data access and application logic. In some instances, a data object can be defined to include multiple attributes (or properties) that can be associated with properties and access rights, among others. Data objects can be defined according to a data model, where data for the data objects can be persisted at a database or storage layer of a server system.

In some instances, storage of data objects at a database can be maintained at a database layer at a server instance and the secret keys can be stored at a key store.

In some instances, to provide high availability and close to zero downtime of the execution of a database and/or server system, multiple servers (or server node) instances may be maintained that store synchronized data. In those instances, one server instance can serve as a primary instance that received user requests, and another instance (or more) can serve as a secondary instance. For example, the secondary instance can be a replication of the first instance. The replication of the first instance into the second instance can be defined as a particular point-in-time replication entity. As an example, the secondary instance can be configured to provide a mirrored copy of the primary instance with a delay of twenty-four (24) hours.

In some implementations, if the primary server instance that stores data in a database(s) experience a downtime, user requests can be redirected to the secondary instance, and the data storage can correspond to the data storage at the primary server instance, for example, at the point-in-time recovery that is configured.

In some implementations, when data from a database at a primary server instance is replicated into a database at a secondary server instance, secret keys associated with encrypting and decrypting the data can also be replicated. Usually, encryption keys are maintained in key stores that reside on the server instances but are separate from the database layers.

In accordance with implementations of the present disclosure, a method for replicating secret keys from a primary server instance to a secondary server instance is established, where the method relies on replication synchronized with the data replication between the database layers of the server instances. In some implementations, secret keys stored at a key store of a primary server instance can be backed-up in log files stored at the database layer, and the log files can be replayed at the secondary server instance to replicate the secret keys at the secondary server instance together with replicating the data from the database. The replication can be executed as a delta replication for data that has been changed since the latest performed replication. The replication can be executed in a sequential manner where secret keys and data are replicated in a way corresponding to their creation and manipulation at the primary server instance.

Figure 1:
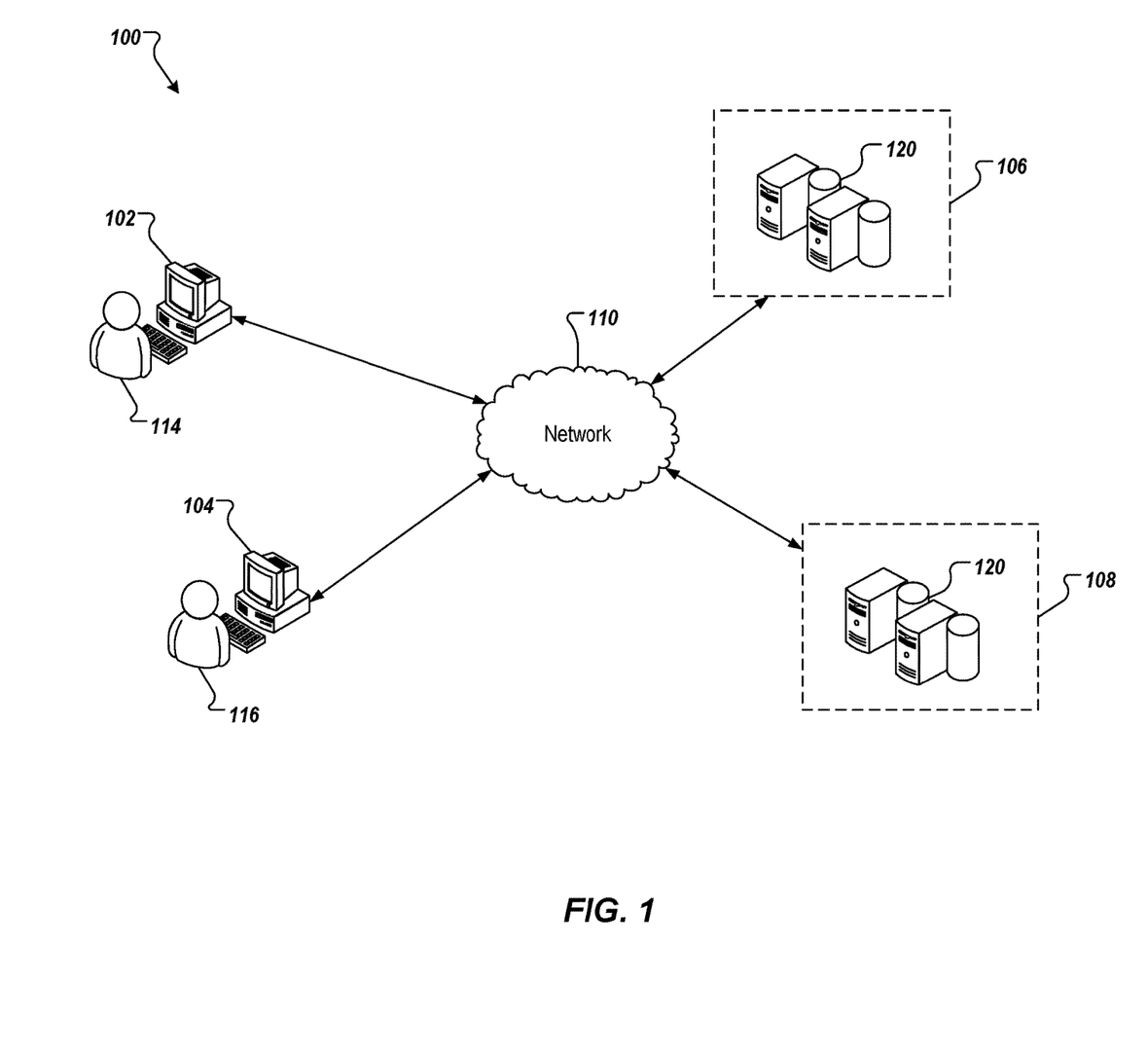
FIG. 1 is a block diagram depicting an example computer-implemented system that can execute implementations of the present disclosure in accordance with implementations of the present disclosure.

FIG. 1 is a block diagram depicting an example computer-implemented system 100 that can execute implementations of the present disclosure in accordance with implementations of the present disclosure. In the depicted example, the example system 100 includes a client device 102, a client device 104, a network 110, a cloud environment 106, and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN), or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on the host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

Figure 2:
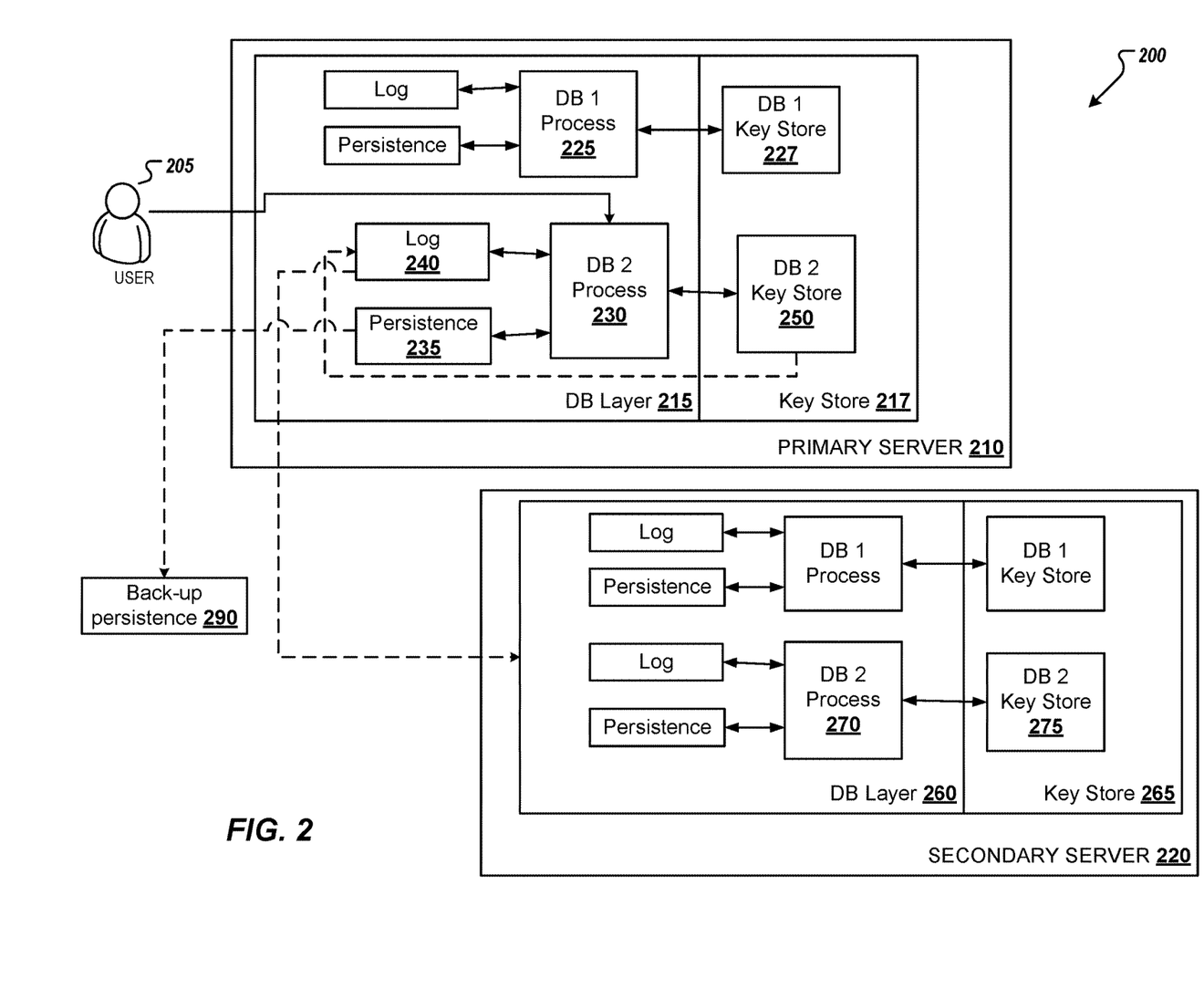
FIG. 2 is a block diagram of an example computing environment, including a primary server and a secondary server that support data and key replication between different databases hosted on each of the servers in accordance with implementations of the present disclosure.

FIG. 2 is a block diagram of an example computing environment 200, including a primary server and a secondary server that support data and key replication between different databases hosted on each of the servers in accordance with implementations of the present disclosure.

In some instances, the computing environment 200 includes two instances (or more not presented in the figure) that include one primary instance of a server (or server node) and a secondary (or multiple secondary) server instance. The multiple instances are maintained to support high availability and efficiency for execution of transactions at a database system that is instantiated into the multiple instances. The database system that is running on the primary server is the one that can be used for serving user requests, for example, for executing data transactions of various types and related to different processes. The database system(s) on the secondary server(s) can represent replication of the database system on the primary server. In some instances, in cases of downtime of the primary server, the secondary server can take over the role of the primary server and serve user requests, while the data at the secondary server would be synchronized with the data at the primary server. In some instances, once a new primary starts receiving new user requests, the replication of data can be performed from that new primary server to one or more secondary servers (e.g., the previous primary server once it recovers from a downtime, or one or more other server instance.

In some instances, data that is stored in databases can be encrypted and decrypted with secret keys for security considerations. In some instances, secret keys can be stored at key stores on the server instances. In some instances, for security reasons, data persistence and key persistence can be separated on the server instances.

In some instances, the key store can be a local secure storage that is a separate, lightweight utility for storing and securely managing encryption keys, encryption root keys, and other similarly sensitive data, such as security-relevant configuration settings. The key store can help protect sensitive server-side data from illegitimate or fraudulent usage.

In some instances, the key store can run as a separate service on a server instance under an isolated operating system that owns the storage of the encryption keys and encryption configuration. This allows operating system-level duties to be strictly separated between system administrators and encryption key administrators and, therefore, lowers the level of trust required in a single operating system user. In some instances, the key store can ensure that database layer clients have unattended access to the encryption root keys that are needed for certain processes, such as automated starts and restarts. This is enabled by a secured communication channel that allows the key store to verify each database layer client that tries to use the channel. The key store can use an allowed list to determine the exact identity of each caller that tries to connect to it and rejects untrusted requests.

In some instances, the key store can be used to store:
encryption roots keys used for data volume encryption, redo log encryption, data and log backup encryption, and the application encryption service within the database;
password of the root key backup; and
encryption configuration information.

In some instances, data between a primary and a secondary server instance can be replicated to maintain synchronization between the instances so that they can exchange their roles for providing services to the user. In some instances, the synchronization can be associated with a point-in-time, and for example, the secondary server may store data associated with an earlier point in time, for example, twelve (12) hours, or twenty-four (24) hours back in time. When data replication is performed between server instances, the key stores (persistence) have to be replicated as well.

In some instances, there may be technical challenges to perform replication of a key store from a primary server to a secondary server. For example, a secondary server may experience some downtime, or the replication of the secret keys from the key store may be difficult to synchronize with the data replication which may create challenges for using the replicated data at the secondary server. Further, the secondary server may be at a different physical location and the network bandwidth might be low and can cause a delay in any network request between the primary (source) server and the secondary (replica) server.

Additionally, when running a point-in-time recovery, the key management has to make sure that the key persistence matches the data persistence. When keys are created or deleted at runtime, using a too old or too new key persistence might result in errors if required keys are missing. In some implementations, a database system running on a server may support a "time travel" feature, which allows to intentionally keep the secondary server instance replicated with a delay.

In some instances, a log replay on the secondary server instance can be started at a previous point in time. Secondary time travel can be a temporary takeover which is effective at a previous point in time. Once secondary time travel has been configured, snapshots and additional log data are retained on the secondary server for a defined period of time. These are then used to start the system at a selected point in the past by opening the appropriate snapshot and replaying the required log entries to reach the requested point. In some instances, a secondary time travel can do a log replay operation. Secondary time travel can be configured to be started using a command with additional options to specify the start time.

In some instances, a primary server 210 can be synchronized with a secondary server 220 based on an initial synchronization of root keys, such as keys stored at DB1 key store 227 and DB2 key store 250, into the secondary server 220, correspondingly at DB1 key store and DB2 key store 275 on key store 265 on the secondary server 220.

In some instances, the primary server 210 includes a database layer 215, where one or more databases are hosted, and where each database is associated with an executed process (or workflow). For example, DB 1 process 225 is a database process where data is stored at a persistence component, and a log file is maintained to track data for executed data transactions.

In some instances, DB2 process 230 is associated with a process executed at the database layer 215 where data is stored at a persistence 235 component, and a log 240 file is associated with the process. The data that is transacted at the process 230 is encrypted data, and multiple keys are associated with different data entries stored at the persistence 235. The secret keys are persisted at a DB2 key store 250 on a key store 217, where the key store 217 is a key persistence layer that is on the primary server 210 but is not residing on the DB layer 215.

In accordance with implementations of the present disclosure, keys from the DB2 key store 250 are persisted (or backed up) at the log 240, where the database layer 215 is synchronized with the DB layer 260 of the secondary server 220 to maintain a replica server that can take over the functions of the primary server 210, for example, in case of a downtime, planned upgrade, or restarting of the primary server 210, among other examples.

In some implementations, the replication of the secret keys from the key stores (e.g., DB 2 key store 250) on the primary server 210 instance to the secondary server 220 instance can be performed by persisting the keys into the logs of the database layer (and a corresponding database of a related process associated with the keys). The log maintained at the database layer can be replayed at the secondary server, so that the database on the secondary server is populated with data (and data changes) performed at the primary server, as well as relevant keys associated with the data and/or the data changes can be transferred to the key stores on the secondary server. The replaying of the logs can be executed as described below in relation to FIGS. 3A and 3B.

In some instances, when log 240 is replayed on the secondary server 220, data transactions that were executed at the DB layer 215 in relation to DB 2 process 230, can be executed on the DB layer 260, for example, as part of DB 2 process 270. The DB 2 process 270 can mirror the execution of the operations of DB 2 process 230, where, by replaying the log, data transactions are executed. For example, new data is stored on the persistence component associated with DB 2 process 270 which corresponds to a logged operation for storing new data at the persistence 235 at the DB layer 215.

In some instances, a process such as DB 2 process 230 can access and read encrypted files and/or data stored on the persistence component by using an encryption root key(s) from the key store to verify the integrity of the process against a rule for allowed or authorized uses.

In some instances, the persistence component 235 on the primary server 210 can be backed-up separately at a back-up persistence 290, where the persistence 235 stores data associated with executed process DB 2 process 230 on the DB layer 215. For example, the process is associated with storing a new table entry, for example, a table entry in a customer table storing data properties for customers (e.g., id, name, address, executed transactions, etc.).

In some instances, the replaying of the log can be performed with a delay to support a time travel function of the database. This functionality can be used to read older data from the secondary (replica) server. In accordance with implementations of the present disclosure and to improve the efficiency of replication of data and keys from one server instance to another, the secret keys associated with a database of a process running on a database system on a server instance can be backed-up into a log file associated with the database. The secret keys from a key store on a primary server can be backed-up at a log file on the database layer on the primary server, and the keys can reach the secondary server through a log shipment executed through the database layer replication between the primary and the secondary servers. The log shipment can be used to replicate the secret keys and the keys can be imported from the key store on the primary server into a log file on the database layer of the primary server and rely on direct network communication configured between the database layer on the primary server and the database layer on the secondary server. In some instances, the replaying of the log file to replicate the secret keys can ensure that the keys reach the secondary server before the secondary server and the running second data-based on the secondary server attempts to decrypt data that was encrypted with that new key that is transferred to the secondary server through replaying the log file.

In some instances, if a point-in-time recovery is done at the secondary server 220 by replaying a log, such as a log 240 on the DB layer 215 that has backed-up keys from DB2 key store 250, a synchronization can be performed up to a desired timestamp, and exactly the required actions can be executed on the key management during log replay.

Figure 3A:
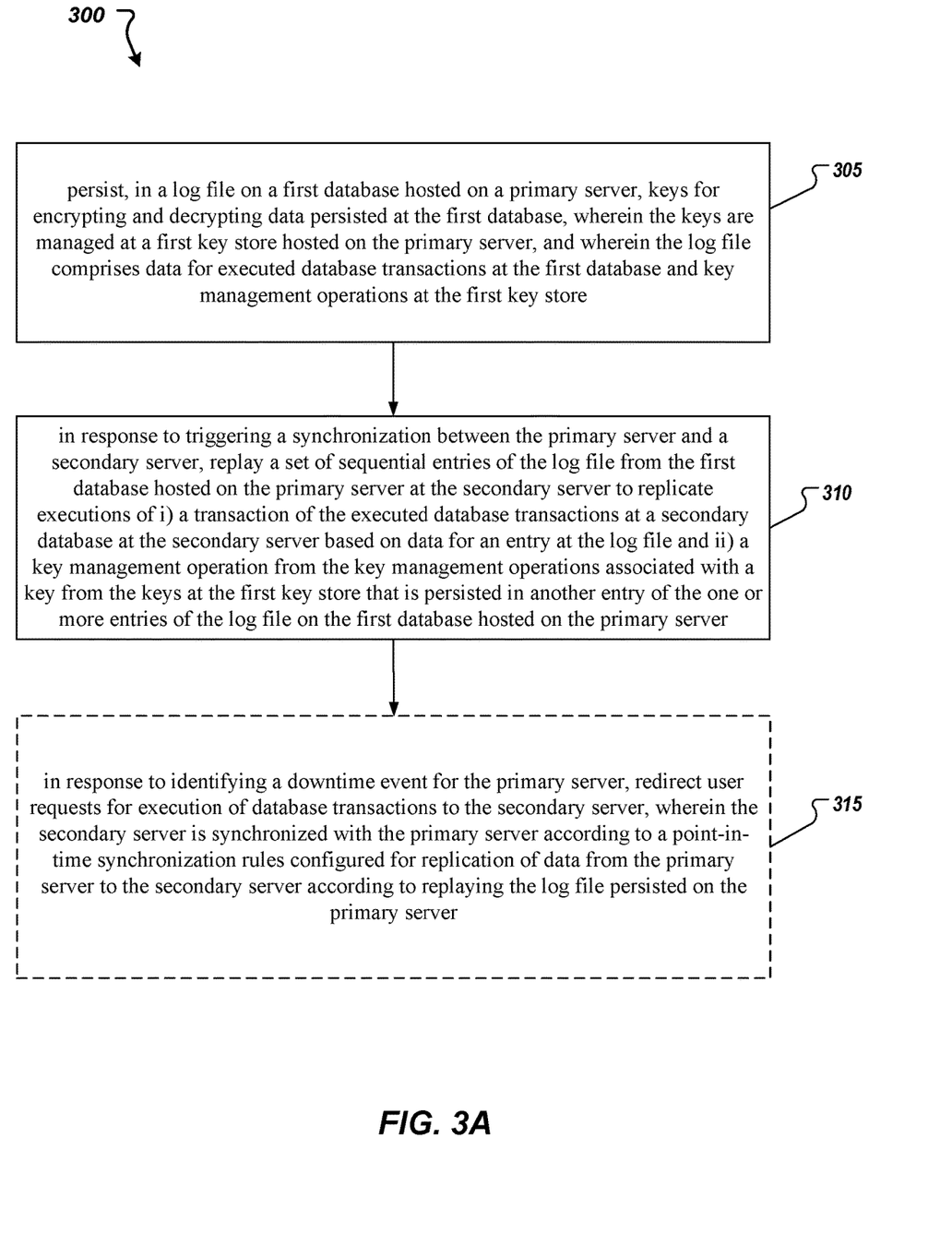
FIG. 3A is an example method flow diagram for data and key replication between primary and secondary server instances in accordance with implementations of the present disclosure.

FIG. 3A is an example method flow diagram 300 for data and key replication between primary and secondary server instances in accordance with implementations of the present disclosure. The data and key replication can be executed on a computing environment as described in FIG. 2. The replication can be performed from a primary server to a secondary server, substantially similar to primary server 210 and secondary server 220.

At 305, keys for encrypting and decrypting data are persisted in a log file on a first database hosted on a primary server. The data that is encrypted and decrypted with such keys is persisted at the first database, where the keys are managed at a first key store hosted on the primary server. The log file includes data for executed database transactions at the first database and key management operations at the first key store.

In some implementations, data for particular database transaction types is encrypted and decrypted with a particular key, where for each encryption of data a new version of the key can be created and maintained for use for decryption later on. In some instances, a key (or a key version of a key) from the keys at the first key store is defined as currently active key version for encrypting data for a predefined transaction type executed at the first database.

In some implementations, the primary server corresponds to the primary server 210 of FIG. 2 and is a primary instance to serve requests from users for data manipulation with data from the first database hosted on the primary server. The secondary server corresponds to the secondary server 220 of FIG. 2 and is a replication server that duplicates the stored data from the primary server 210. In some instances, if the primary server experiences downtime or requires to be in a non-working mode (e.g., performing updates or upgrades, or other system improvements), the functionality provided by the primary server can be configured to be provided by the secondary server. Since the secondary server is a replica of the primary server, the transition of the data transactions can be executed smoothly and without losing data or downtime.

In some instances, the primary server handles received user requests for executing data transactions at the first database, while the secondary server is a replication (e.g., backup) server that can take over the whole of a primary server if the primary server needs to be stopped, paused, or experiences downtime (e.g., scheduled downtime or unexpected downtime).

In some instances, the data at the log file is descriptive data for executed database transactions associated with persisted database data at a persistence store at the first database.

In some instances, a key management operation includes at least one of creating a new key as a new version of an old key used for encrypting data of a database transaction of a particular type, activating the new key to be used for encrypting the data, and deleting an existing key in the first key store. In some instances, a created new key is not available for encrypting data prior to activation.

At 310, in response to triggering a synchronization between the primary server and the secondary server, a set of sequential entries of the log file are replayed from the first database hosted on the primary server at the secondary server to replicate executions of i) a transaction of the database transactions at a secondary database at the secondary server based on data for an entry at the log file and ii) a key management operation from the key management operations associated with a key from the keys at the first key store that is persisted in another entry of the one or more entries of the log file on the first database hosted on the primary server.

In some implementations, based on replaying the set of sequential entries of the log file at the secondary server, data at the second database on the secondary server is synchronized with the data persisted on the first database.

In some instances, replaying the log file is associated with a point-in-time data recovery for transferring one or more keys and a portion of data according to a time point configured for the replaying. In some instances, the data at the log file for the executed database transactions includes timestamps of execution of the database transactions.

In some instances, replaying of the log file at the secondary server is performed according to a sequential order of entries in the log file to replicate i) the data from the first database to the second database on the secondary server and ii) the key from the keys at the first key store on the primary server to a second key store on the secondary server.

At 315, in response to identifying a downtime event (or another event that requires stopping execution of services) for the primary server, user requests for execution of database transactions are redirected to the secondary server. The secondary server is synchronized with the primary server, and thus, the secondary server can serve use requests in a similar manner as the primary server. The synchronization between the primary and the secondary server can be executed according to a point-in-time synchronization rules configured for the replication of data from the primary server to the secondary server, as executed at 310. The configuration of the synchronization can be defined for the execution of the replaying of the log file persisted on the primary server at the secondary server.

Figure 3B:
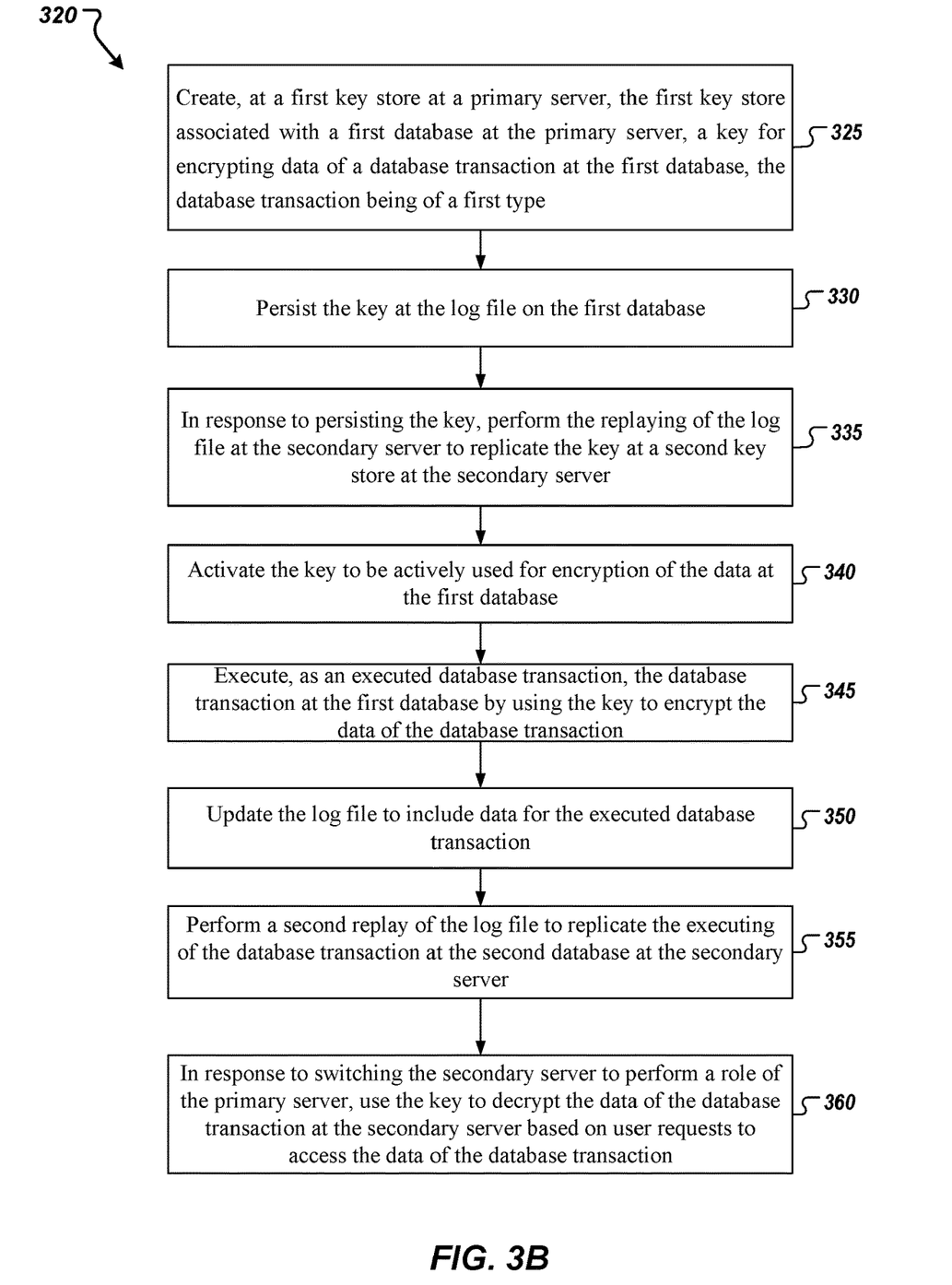
FIG. 3B is an example method flow diagram for creating a log file storing information for executed data transactions at a database and key management of keys at a key store for encrypting data of the database transactions at the database in accordance with implementations of the present disclosure.

FIG. 3B is an example method flow diagram 320 for creating a log file storing information for executed data transactions at a database and key management of keys at a key store for encrypting data of the database transactions at the database in accordance with implementations of the present disclosure. In some instances, multiple log files can be created for storing the information for the executed data transactions and the keys. The log file includes secret key information as well as data for executed data transactions at a database, such as database transactions that can be executed on a computing environment as described for FIG. 2. The replication can be performed from a primary server to a secondary server, substantially similar to primary server 210 and secondary server 220.

At 325, a key for encrypting data of a database transaction at the first database is created at a first key store, such as the key store 217 of FIG. 1. The database transaction can be a transaction of a first type. In some instances, the created key can be a new version of a key for that first transaction type.

In some instances, a set of keys of the keys managed at the first key store are associated with a particular type of database transaction associated with a process executed at the first database. In some instances, the set of keys includes different versions of a key for the particular type of database transactions. In some cases, a single key of the set of keys is a currently active key to be used for encrypting database transactions requested by users.

At 330, the key is persisted at the log file on the first database.

At 335, in response to persisting the key, a replay of the log file is performed, for example, substantially similar to the replay described at operation 310 of FIG. 3A. The replay is performed at the secondary server to replicate the key at a second key store at the secondary server.

At 340, the key is activated to be actively used for encryption of the data at the first database at the first server.

At 345, a database transaction is executed at the first database by using the key to encrypt the data of the database transaction.

At 350, the log file is updated to include data for the executed database transaction.

At 355, a second replay of the log file is performed to replicate the execution of the database transaction at the second database at the secondary server.

At 360, in response to switching the secondary server to perform a role of the primary server, the key is used at the secondary server to decrypt the data of the database transaction at the secondary server based on user requests to access the data of the database transaction.

Figure 3C:
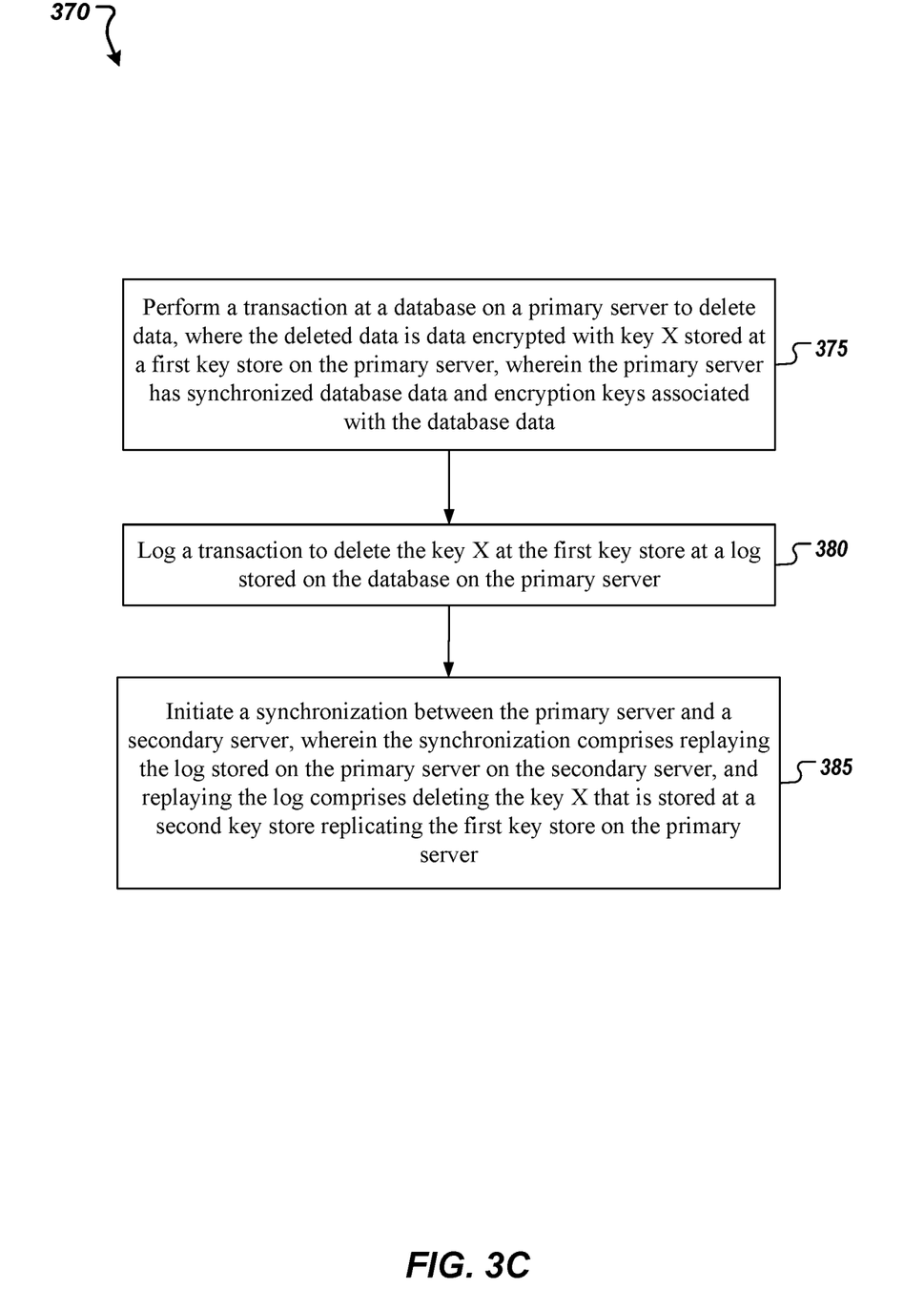
FIG. 3C is an example method flow diagram for deleting a persisted key associated with database transactions in accordance with implementations of the present disclosure.

FIG. 3C is an example method flow diagram 370 for deleting a persisted key associated with database transactions in accordance with implementations of the present disclosure. The key deletion can be executed on a computing environment as described in FIG. 2. The replication can be performed from a primary server to a secondary server, substantially similar to primary server 210 and secondary server 220.

At 375, a transaction is performed at a database on a primary server to delete data. The database can be the first database on the primary server as described in relation to FIGS. 2, 3A, and 3B. The deleted data is data encrypted with key X stored at a first key store on the primary server. The first key store can be substantially similar to the first key store described in FIGS. 2, 3A, and 3B. The primary server has synchronized database data and encryption keys associated with the database data. The data synchronization can be executed as described in relation to FIG. 3A and the replay of log files at the database layer that store keys (that are also persisted and managed in key stores outside the database layer) and data for data transactions executed at the database layer.

At 380, a transaction to delete the key X at the first key store is logged at a log stored on the database on the primary server.

At 385, a synchronization between the primary server and the secondary server is initiated. The synchronization comprises replaying the log stored on the primary server on the secondary server. In some instances, replaying the log comprises deleting the key X that is stored at a second key store replicating the first key store on the primary server.

Figure 4:
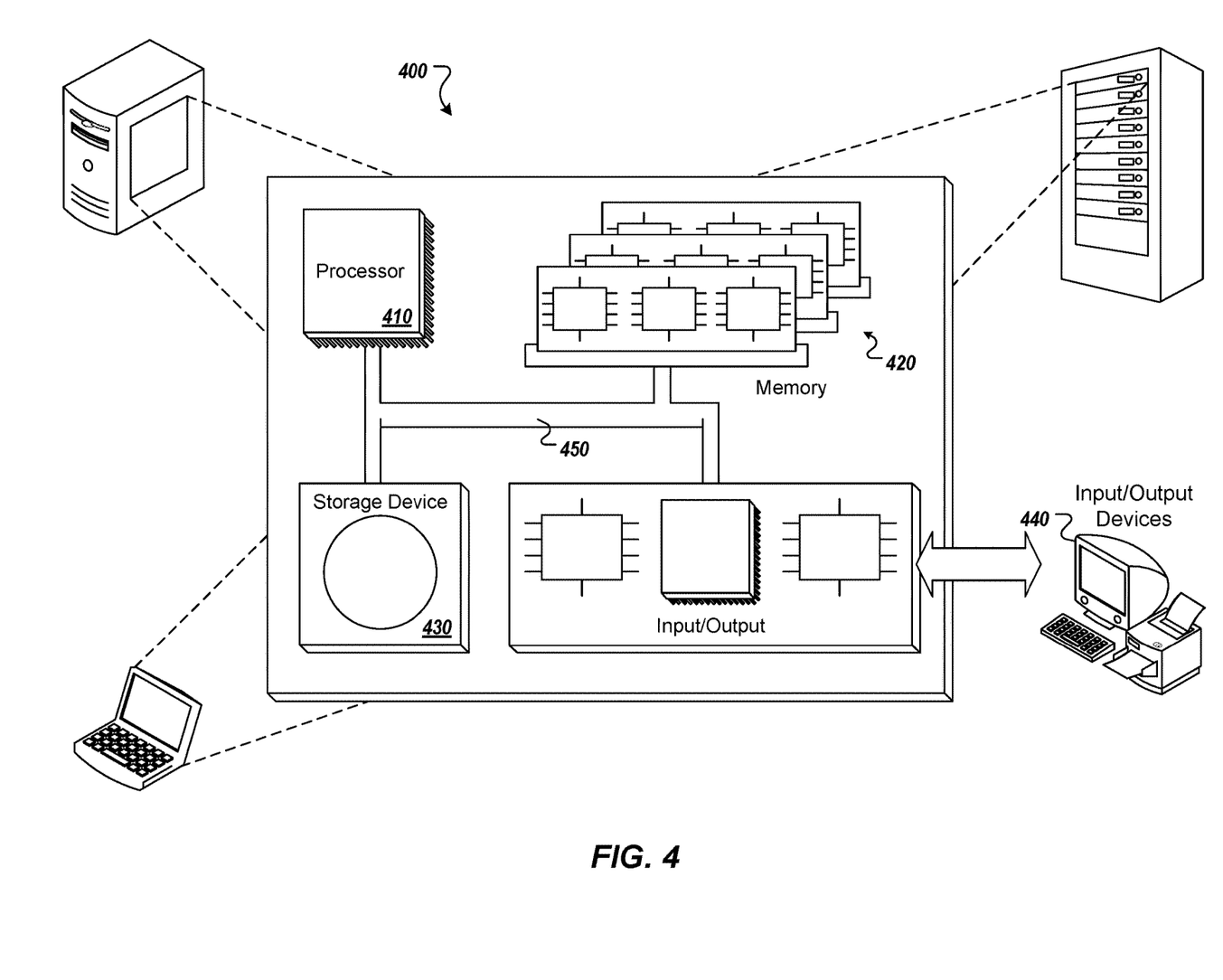
FIG. 4 is a schematic diagram of an example computer system that can be used to execute implementations of the present disclosure.

FIG. 4 is a schematic diagram of an example computer system 400 that can be used to execute implementations of the present disclosure. For example, the computer system 400 may be included in any or all of the server components discussed herein. The computer system 400 includes a processor 410, a memory 420, a storage device 430, and an input/output device 440. The components 410, 420, 430, and 440 are interconnected using a system bus 450. The processor 410 is capable of processing instructions for execution within the computer system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the computer system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the computer system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

Examples

Although the present application is defined in the attached claims, it should be understood that the present invention can also be (alternatively) defined in accordance with the following examples:

Example 1. A computer-implemented method comprising:
persisting, in a log file on a first database hosted on a primary server, keys for encrypting and decrypting data persisted at the first database, wherein the keys are managed at a first key store hosted on the primary server, and wherein the log file comprises data for executed database transactions at the first database and key management operations at the first key store; and
in response to triggering a synchronization between the primary server and a secondary server, replaying a set of sequential entries of the log file from the first database hosted on the primary server at the secondary server to replicate executions of i) a transaction of the executed database transactions at a secondary database at the secondary server based on data for an entry at the log file and ii) a key management operation from the key management operations associated with a key from the keys at the first key store that is persisted in another entry of the one or more entries of the log file on the first database hosted on the primary server.

Example 2. The method of Example 1, comprising:
based on replaying the set of sequential entries of the log file at the secondary server, synchronizing data at the second database on the secondary server with the data persisted on the first database.

Example 3. The method of Example 1 or Example 2, wherein the data at the log file is descriptive data for executed database transactions associated with persisted database data at a persistence store at the first database.

Example 4. The method of any one of the previous Examples, wherein a key management operation includes at least one of creating a new key as a new version of an old key used for encrypting data of a database transaction of a particular type, activating the new key to be used for encrypting the data, and deleting an existing key in the first key store.

Example 5. The method of Example 4, wherein a created new key is not available for encrypting data prior to activation.

Example 6. The method of any one of the previous Examples, wherein the primary server handles received user requests for executing data transactions at the first database.

Example 7. The method of any one of the previous Examples, wherein the replaying of the log file is associated with a point-in-time data recovery for transferring one or more keys and a portion of data according to a time point configured for the replaying.

Example 8. The method of any one of the previous Examples, wherein the data at the log file includes data that is for the executed database transactions and includes timestamps of execution of the executed database transactions.

Example 9. The method of any one of the previous examples, wherein a key from the keys at the first key store is defined as a currently active key version for encrypting data for a predefined transaction type executed at the first database.

Example 10. The method of any one of the previous examples, wherein the log file stores data for the executed database transactions and the key management operations in a sequential order.

Example 11. The method of Example 10, wherein the replaying is performed according to a sequential order of entries in the log file to replicate i) the data from the first database to the second database on the secondary server and ii) the key from the keys at the first key store on the primary server to a second key store on the secondary server.

Example 12. The method of any one of the previous Examples, comprising:
creating, at the first key store, a key for encrypting data of a database transaction at the first database, the database transaction being of a first type;
persisting the key at the log file on the first database;
in response to persisting the key, performing the replaying of the log file at the secondary server to replicate the key at a second key store at the secondary server;
activating the key to be actively used for encryption of the data at the first database; and executing, as an executed database transaction, the database transaction at the first database by using the key to encrypt the data of the database transaction.

Example 13. The method of Example 12, comprising:
updating the log file to include data for the executed database transaction;
performing a second replay of the log file to replicate the executing of the database transaction at the second database at the secondary server; and
in response to switching the secondary server to perform a role of the primary server, using the key to decrypt the data of the database transaction at the secondary server based on under requests to access the data of the database transaction.

Example 14. The method of any one of the previous Examples, wherein a set of keys managed at the key store are associated with a particular type of database transactions associated with a process executed at the first database, wherein the set of keys include different versions of a key for the particular type of database transactions, wherein a single key of the set of keys is a currently active key to be used for encrypting database transactions requested by users.

Example 15. The method of any one of the previous Examples, comprising:
in response to identifying a downtime event for the primary server, redirecting user requests for execution of database transactions to the secondary server, wherein the secondary server is synchronized with the primary server according to a point-in-time synchronization rules configured for replication of data from the primary server to the secondary server according to replaying the log file persisted on the primary server.

Example 16. A system comprising:
one or more processors; and
one or more computer-readable memories coupled to the one or more processors and having instructions stored thereon that are executable by the one or more processors to perform the method of any of Examples 1 to 15.

Example 17: A non-transitory, computer-readable medium coupled to one or more processors and having instructions stored thereon which, when executed by the one or more processors, cause the one or more processors to perform the method of any of Examples 1 to 15.

What is claimed is:
1. A computer-implemented method comprising:
persisting, in a log file on a first database hosted on a primary server, keys for encrypting and decrypting data persisted at the first database, wherein the keys are managed at a first key store hosted on the primary server, and wherein the log file comprises data for executed database transactions at the first database and key management operations at the first key store; and
in response to triggering a synchronization between the primary server and a secondary server, replaying, at the secondary server, a set of sequential entries of the log file from the first database hosted on the primary server to replicate executions of (i) a transaction of the executed database transactions at a secondary database at the secondary server based on data for an entry at the log file and (ii) a key management operation from the key management operations associated with a key from the keys at the first key store that is persisted in another entry of the one or more entries of the log file on the first database hosted on the primary server.

2. The method of claim 1, comprising:
based on replaying the set of sequential entries of the log file at the secondary server, synchronizing data at the second database on the secondary server with the data persisted on the first database.

3. The method of claim 1, wherein a key management operation includes at least one of:
creating a new key as a new version of an old key used for encrypting data of a database transaction of a particular type;
activating a new key to be used for encrypting the data; and
deleting an existing key in the first key store.

4. The method of claim 1, wherein replaying the log file is associated with a point-in-time data recovery for transferring one or more keys and a portion of data according to a time point configured for the replaying.

5. The method of claim 1, wherein the data at the log file includes data that is for the executed database transactions and includes timestamps of execution of the executed database transactions.

6. The method of claim 1, wherein a key from the keys at the first key store is defined as a currently active key version for encrypting data for a predefined transaction type executed at the first database.

7. The method of claim 1, wherein the log file stores data for the executed database transactions and the key management operations in a sequential order, and wherein the replaying is performed according to the sequential order of entries in the log file to replicate (i) the data from the first database to the second database on the secondary server and (ii) the key from the keys at the first key store on the primary server to a second key store on the secondary server.

8. The method of claim 1, wherein a set of keys of the keys managed at the key store are associated with a respective type of database transactions associated with a process executed at the first database, wherein the set of keys include different versions of a key for the respective type of database transactions, wherein a single key of the set of keys is a currently active key to be used for encrypting database transactions requested by users.

9. The method of claim 1, comprising:
in response to identifying a downtime event for the primary server, redirecting user requests for execution of database transactions to the secondary server, wherein the secondary server is synchronized with the primary server according to a point-in-time synchronization rule configured for replication of data from the primary server to the secondary server according to replaying the log file persisted on the primary server.

10. A non-transitory, computer-readable medium coupled to one or more processors and having instructions stored thereon which, when executed by the one or more processors, cause the one or more processors to perform operations, the operations comprising:
persisting, in a log file on a first database hosted on a primary server, keys for encrypting and decrypting data persisted at the first database, wherein the keys are managed at a first key store hosted on the primary server, and wherein the log file comprises data for executed database transactions at the first database and key management operations at the first key store; and
in response to triggering a synchronization between the primary server and a secondary server, replaying, at the secondary server, a set of sequential entries of the log file from the first database hosted on the primary server to replicate executions of i) a transaction of the executed database transactions at a secondary database at the secondary server based on data for an entry at the log file and ii) a key management operation from the key management operations associated with a key from the keys at the first key store that is persisted in another entry of the one or more entries of the log file on the first database hosted on the primary server.

11. The computer-readable medium of claim 10, wherein the instructions stored thereon further comprise instructions, which when executed, cause the one or more processors to perform operations comprising:
based on replaying the set of sequential entries of the log file at the secondary server, synchronizing data at the second database on the secondary server with the data persisted on the first database.

12. The computer-readable medium of claim 10, wherein a key management operation includes at least one of:
creating a new key as a new version of an old key used for encrypting data of a database transaction of a particular type;
activating a new key to be used for encrypting the data; and
deleting an existing key in the first key store, and
wherein the data at the log file includes data that is for the executed database transactions and includes timestamps of execution of the executed database transactions.

13. The computer-readable medium of claim 10, wherein the log file stores data for the executed database transactions and the key management operations in a sequential order, and wherein the replaying is performed according to the sequential order of entries in the log file to replicate i) the data from the first database to the second database on the secondary server and ii) the key from the keys at the first key store on the primary server to a second key store on the secondary server.

14. The computer-readable medium of claim 10, wherein a set of keys of the keys managed at the key store are associated with a respective type of database transactions associated with a process executed at the first database, wherein the set of keys include different versions of a key for the respective type of database transactions, wherein a single key of the set of keys is a currently active key to be used for encrypting database transactions requested by users.

15. The computer-readable medium of claim 10, wherein the instructions stored thereon further comprise instructions, which when executed, cause the one or more processors to perform operations comprising:
in response to identifying a downtime event for the primary server, redirecting user requests for execution of database transactions to the secondary server, wherein the secondary server is synchronized with the primary server according to a point-in-time synchronization rule configured for replication of data from the primary server to the secondary server according to replaying the log file persisted on the primary server.

16. A system comprising
a computing device; and
a computer-readable storage device coupled to the computing device and having instructions stored thereon which, when executed by the computing device, cause the computing device to perform operations, the operations comprising:
persisting, in a log file on a first database hosted on a primary server, keys for encrypting and decrypting data persisted at the first database, wherein the keys are managed at a first key store hosted on the primary server, and wherein the log file comprises data for executed database transactions at the first database and key management operations at the first key store; and in response to triggering a synchronization between the primary server and a secondary server, replaying, at the secondary server, a set of sequential entries of the log file from the first database hosted on the primary server to replicate executions of i) a transaction of the executed database transactions at a secondary database at the secondary server based on data for an entry at the log file and ii) a key management operation from the key management operations associated with a key from the keys at the first key store that is persisted in another entry of the one or more entries of the log file on the first database hosted on the primary server.

17. The system of claim 16, wherein the instructions stored thereon further comprise instructions, which when executed, cause the one or more processors to perform operations comprising:

based on replaying the set of sequential entries of the log file at the secondary server, synchronizing data at the second database on the secondary server with the data persisted on the first database.

18. The system of claim 16, wherein a key management operation includes at least one of:

creating a new key as a new version of an old key used for encrypting data of a database transaction of a particular type;

activating a new key to be used for encrypting the data; and deleting an existing key in the first key store, and wherein the data at the log file includes data that is for the executed database transactions and includes timestamps of execution of the executed database transactions.

19. The system of claim 16, wherein the log file stores data for the executed database transactions and the key management operations in a sequential order, and wherein the replaying is performed according to the sequential order of entries in the log file to replicate i) the data from the first database to the second database on the secondary server and ii) the key from the keys at the first key store on the primary server to a second key store on the secondary server.

20. The system of claim 16, wherein a set of keys of the keys managed at the key store are associated with a respective type of database transactions associated with a process executed at the first database, wherein the set of keys include different versions of a key for the respective type of database transactions, wherein a single key of the set of keys is a currently active key to be used for encrypting database transactions requested by users.

* * * * *